United States Patent [19]

Gonzalez et al.

[11] Patent Number: 4,834,657
[45] Date of Patent: May 30, 1989

[54] PUNISHMENT WHEEL

[76] Inventors: José R. Gonzalez, 1448 37th Ave. SE., Olympia, Wash. 98501; Connie J. Vaughan, P.O. Box 262, Satsop, Wash. 98583; Mary Jo R. Gonzalez, 1448 37th Ave. SE., Olympia, Wash. 98501

[21] Appl. No.: 196,673

[22] Filed: May 20, 1988

[51] Int. Cl.$^4$ .................. G09B 1/22; G09B 19/00
[52] U.S. Cl. .................... 434/238; 273/142 R
[58] Field of Search ............ 434/236, 238, 402, 404, 434/107; 273/142 R

[56] References Cited

U.S. PATENT DOCUMENTS

| 1,811,960 | 6/1931 | Orr | 273/142 R |
| 2,626,156 | 1/1953 | Bergh | 273/142 R |
| 2,853,803 | 9/1958 | Exton, Jr. | 434/107 |
| 3,249,085 | 5/1966 | St. Jean | 434/404 X |
| 3,782,009 | 1/1974 | Darnell | 434/238 |
| 4,741,701 | 5/1988 | Kosser | 434/238 |

Primary Examiner—William H. Grieb
Attorney, Agent, or Firm—Brian J. Coyne

[57] ABSTRACT

An apparatus for choosing a punishment for a child, and a method of its use, are disclosed. An assortment of adhesive-backed decals designating various punishments is provided. Decals selected from the assortment by the parents are positioned around a base wheel. The child spins a knob and pointer that are centrally and rotatably mounted on the base wheel. When the knob and pointer come to rest, that punishment is imposed as indicated by the pointer.

13 Claims, 2 Drawing Sheets

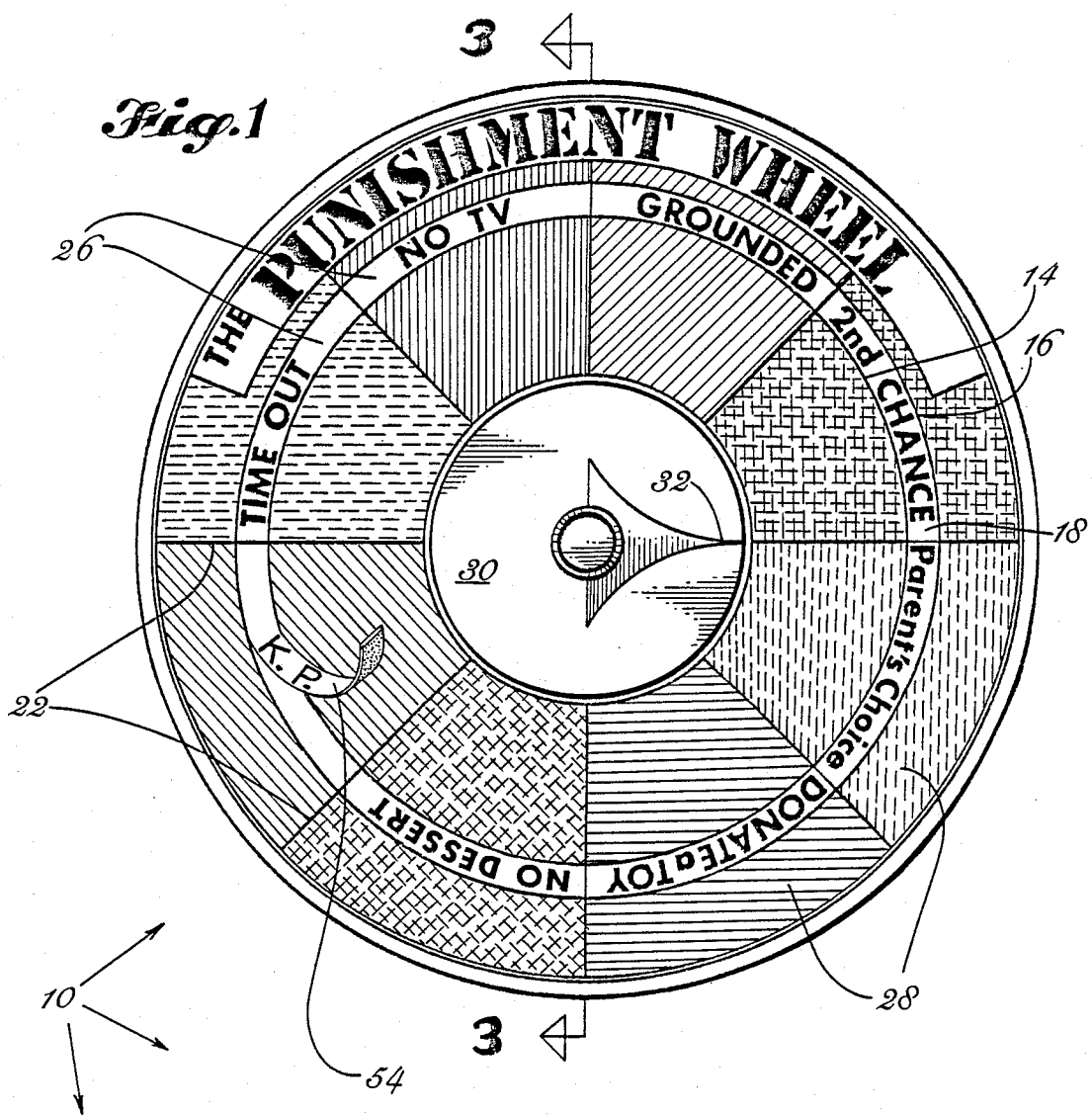
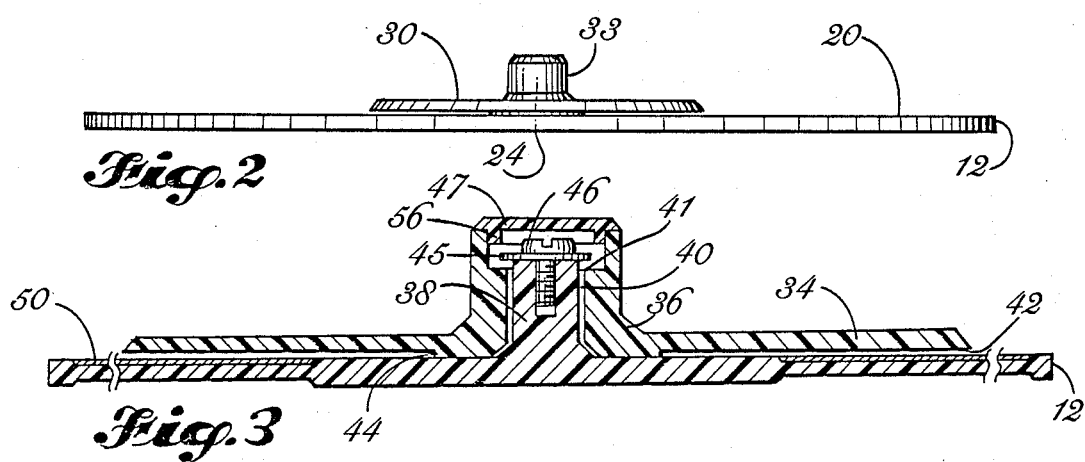

PUNISHMENT WHEEL

CROSS-REFERENCE TO RELATED APPLICATIONS

There are no related applications to the United States Patent and Trademark Office.

Statement as to rights to inventions made under federally-sponsored research and development (if any)

No federally-sponsored research or development was involved in applicants' Punishment Wheel invention.

BACKGROUND OF THE INVENTION

This invention relates to the field of devices for modifying the behavior of immature persons, especially children. It is intended to provide a method and apparatus for practicing the method whereby a child will participate in choosing the punishment that he is to receive for his improper behavior. This is accomplished by having the child spin a wheel with an indicator over a display of various punishment possibilities. The punishment imposed is that indicated when the wheel comes to rest. From the child's point of view, it appears that an inanimate object is choosing and imposing the punishment, instead of his parents. Direct parent-child conflict is thereby eliminated.

DESCRIPTION OF THE PRIOR ART

Darnell, U.S. Pat. No. 3,782,009 (Jan. 1, 1974), disclosed a record keeping device for providing visible and readily accessible cumulative storage of points earned by students in a social behavior and scholastic achievement incentive program. A matrix of pockets was provided wherein each row of the matrix would be labeled with the name of a student and the columns of the matrix correspond to scholastic achievements or desired behavior traits. Students'scholastic achievements and desirable behavior would be recognized by inserting into the appropriate slots sticks of cardboard or other suitable material of various colors representing points of gradated magnitude.

Kossor, U.S. Pat. No. 4,741,701 (May 3, 1988), disclosed a behavior monitoring and status reporting device. Kossor's device included a shaft, an indicator mounted for slidable movement thereon, and a panel having indicia indicating a plurality of objectives and at least one reward. The current status of the monitored person's behavior would be indicated by moving the indicator to the location of the appropriate indicia on the panel. In an alternative application, the panel was partitioned into areas having indicia indicating particular classes of undesirable behavior. Manifestation by the monitored person of any of the displayed undesirable behavior would be indicated by moving the indicator to the appropriate location on the panel, and a pre-determined penalty would be administered.

Unlike Darnell's and Kossor's, the present invention displays a plurality of punishments that may be imposed and introduces the element of chance of the choosing of a particular punishment: neither the parent nor the child has any control over where the indicator will come to rest on the punishment wheel.

In its preferred embodiment, our punishment wheel includes a plurality of adhesive-backed decals, each decal having a different punishment written thereon. Such decals may be shaped as circular sectors with a single decal being placed in each separate sector of the punishment wheel. Exton, U.S. Pat. No. 2,853,803 (Sept. 30, 1958), disclosed an educational device for audio-visual presentations that included reusable adhesive-backed decals or attachments that were shaped as circular sectors. In Exton's device, such decals would be placed on a chart or display board during an audio-visual presentation in order to achieve clarity and hold an audience's attention. Of course, no element of chance was incorporated into the device.

Bergh, U.S. Pat. No. 2,626,156 (Jan. 20, 1953), disclosed a rotating chance game apparatus that combined a base having an ashtray with a scoring wheel mounted thereover, and a pointer projecting radially in front of the wheel. The apparatus further included a rim concentrically mounted on the wheel and having scoring symbols thereon, whereby a score would be indicated by the pointer after the user had spun the wheel and the wheel came to rest.

Orr, U.S. Pat. No. 1,811,960 (June 30, 1931), disclosed apparatus for playing a game of chance wherein the play for each game participant was determined according to which of various lettered indicia placed around the game board a spinner would point after the spinner had been spun and come to rest. Orr's game was designed exclusively for amusement and entertainment, rather than as an aid in choosing a suitable punishment.

St. Jean, U.S. Pat. No. 3,249,085 (May 3, 1966), disclosed a nautical data correlator comprising a circular-based disk and a circular scanning disk of decreased diameter concentrically mounted on each side of the base disk and capable of rotation with respect to the base disk. The base disk had an exposed rim portion subdivided into a plurality of arcuated sectors, and each of the arcuated sectors had printed therein descriptive phrases identifying various nautical conditions or procedures. Sector-shaped windows were cut in the scanning disks for reviewing pictorial illustrations printed on the base disk, depicting the identification for the condition or procedure printed in the arcuated sector, radially spaced therefrom.

SUMMARY OF THE INVENTION

In the preferred embodiment, the apparatus of the present invention includes a base wheel divided into a plurality of circular sectors by radial lines thereon. The circular sectors are further subdivided by the intersection of the radial lines with concentric circles thereby defining annular sectors. A plurality of adhesive-backed decals is provided to the user, shaped to conform to the annular sectors of the base wheel. Each decal has a different punishment written thereon. The user selects a set of decals from among those provided having the desired choice of punishments and places one decal of the set on each of the annular sectors of the base wheel. Blank decals are also provided so that the user can write thereon a punishment of his own choice. Rotatably mounted on the base wheel is a knob wheel having a pointer attached thereto for selecting a punishment. When a child violates family rules, or otherwise engages in improper behavior, the parent invites the child to spin the knob wheel. When the knob wheel comes to rest, that punishment is imposed as indicated by the pointer. Thus, chance is involved in the selection of a punishment, as neither the parents nor the child can control where the pointer will come to rest. At the parents' discretion, an additional element of chance can be included by placing on one of the annular sectors of the base wheel a decal having written thereon "parent's choice," indicating that the parent will choose the punishment.

It is, therefore, an object of the present invention to provide a method for selecting a punishment for a child wherein the child participates in the choosing of the punishment.

It is another object of the invention to provide a method as described above, wherein the selection of punishments for a child can be determined by the parents to suit the parents' disciplinary style and the maturity of the child.

It is still another object of the invention to provide an apparatus that can be used to practice the methods described above.

BRIEF DESCRIPTION OF THE DRAWING

FIG. 1 is a plan view of our apparatus showing the front face of the base wheel with a selection of decals and the knob wheel mounted thereon;

FIG. 2 is a side elevational view thereof;

FIG. 3 is an enlarged cross-sectional view taken along the line 3—3 of FIG. 1;

DESCRIPTION OF THE PREFERRED EMBODIMENT

Figure 4:
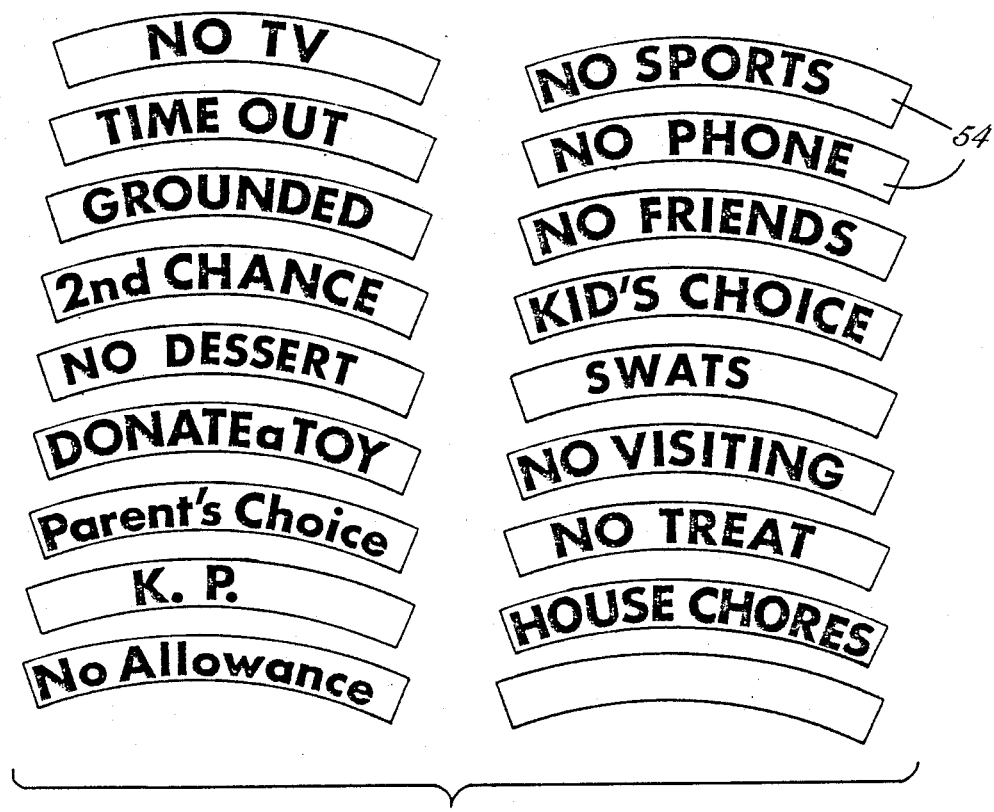
FIG. 4 shows an assortment of annular sector-shaped decals having various punishments written thereon and one blank decal.

Referring now to the drawings wherein like referenced characters designate like parts throughout the several views thereof, the front portions of which are shown in FIG. 1, there is shown an apparatus for selecting one punishment from a plurality of punishments generally designated by the reference character 10. The apparatus comprises a base wheel 12 being a disk formed of plastic, cardboard or the like. The diameter of the base wheel is preferably ten and one-half inches [26.7 cm], more or less, thereby providing a convenient size for mounting the apparatus vertically on a wall, or placing the apparatus on a horizontal surface, such as a table.

The front face 20 of the base wheel 12 preferably has a first circular line 14 and a second circular line 16 of diameter larger than that of the first circular line 14, thereby defining an annular area 18 on the base wheel 12 and concentric with the center thereof. The front face 20 of the base wheel 12 is further divided into sectors by lines 22 that extend from the central portion 24 of the base wheel 12 to the periphery thereof, thereby dividing the annular area 18 into a plurality of annular sectors 26, as may be seen in FIG. 1. Preferably, the radial lines 22 are positioned so as to create eight annular sectors 26 of equal size and eight circular sectors 28 also of equal size. The circular sectors 28 are preferably colored in different colors to enhance the appearance of the apparatus. The radial lines 22 and the circular lines 14, 16 may be printed or inscribed directly on the front face 20 of the base wheel 12; alternatively, as may be seen in FIG. 3, they may be printed or inscribed on a thin annular disk 50, which disk is then fitted into an annular recess on the front face 20 of the base wheel 12.

The apparatus further comprises a knob wheel 30 rotatably mounted on the front face 20 of the base wheel 12. A pointer 32 is attached to the knob wheel 30 and is preferably integral therewith. The diameter of the knob wheel 30 is less than or equal to the diameter of the first circle 14 and is preferably three inches [7.6 cm]. As may be seen in FIG. 3, the knob wheel 30 has a centrally disposed, raised cylindrical knob portion 33, and an annular disk portion 34 radially outward therefrom, the disk portion 34 being joined to the knob portion 33 at the rear margin 36 thereof. The front surface 20 of the base wheel 12 has an upstanding, centrally disposed cylindrical boss 38 that serves as a hub about which the knob wheel 30 rotates. The knob portion 33 of the knob wheel 30 has a cylindrical recess 40 on its rear surface to receive the boss 38. At the rear margin of the recess 40 is an annular rim or lip 44 for rotational contact with the front face 20 of the base wheel 12. The rear surface 42 of the disk portion 34 of the base wheel 30 is raised away from the front face 20 of the base wheel 12 so as to minimize the friction of rotation.

The apparatus further comprises means for rotatably attaching the knob portion 33 to the boss 38. One such means is illustrated in FIG. 3; the front portion of the recess 40 has an enlarged diameter to accommodate a washer 45 and a screw 46 inserted through the washer 45 and into the boss 38. The said enlarged diameter creates a shoulder 41 within the recess 40 such that the overlying washer 45 prevents the know wheel 30 from detaching from the base wheel 12. Access to the screw 46 and washer 45 is provided by a detachable disk-shaped cap 47 having flange 56 on its rear surface for insertion into the recess 40, which cap 47 forms the forwardmost surface of the knob portion 33.

The apparatus also includes an assortment of adhesive-backed decals 54, as displayed in FIG. 4, which decals are preferably shaped as annular sectors. In use, parents would select from among the decals provided an array of suitable punishments for their child. As illustrated in FIG. 4, the assortment of punishments provided preferably includes: "No TV," "Time Out," "Grounded," "Second Chance," "No Dessert," "Donate a Toy," "Parent's Choice," "K.P.," "No Allowance," "No Sports," "No Phone," "No Friends," "Kid's Choice," "Swats," "No Visiting," "No Treat," and "House Chores." An additional blank decal may be provided to afford the parents the option of writing their own choice of a punishment. See FIG. 4.

We believe that the terms shown in FIG. 4 are familiar to English-speaking parents. For example, "K.P." is an abbreviation for the term "kitchen patrol," indicating that the child would have to perform kitchen chores, such as washing dishes. "Second chance" indicates that no punishment will be imposed and the child will be given another chance to show that he can behave properly. "Kid's Choice" provides the child with the opportunity to choose his own punishment. "No Friends" means that the child will be denied the opportunity to visit with his friends for some period of time. "No phone" means that the child may not use the telephone. "Time out" prohibits the child from engaging in any activities. "No Sports" prevents the child from participating in any sports. "Grounded" means the child is not to go out of the home. "Swats" means a spanking.

It should be understood that the foregoing is only illustrative of our invention as numerous changes can be made therein falling within the spirit and intent of our invention. For example, the base wheel could be divided into geometric patterns other than circular sectors and annular sectors. The punishments need not be those shown in FIG. 4, but could be any set of punishments, expressed in any language, deemed suitable for the disciplinary style of particular parents and the degree of maturity of their child. In addition to plastic or cardboard, the base wheel and/or knob wheel can be made of any other suitable material such as wood, metal or ceramic. Furthermore, although the method described provides that the parents select the decals and position them on the base wheel, and the child spins the knob wheel, these roles can be shared or interchanged between parents and child.

We claim:

1. Apparatus for selecting one punishment from a plurality of punishments, comprising:
    (a) a base wheel;
    (b) a knob wheel rotatably mounted on the base wheel;
    (c) a pointer attached to the knob wheel for selecting a punishment; and
    (d) a plurality of adhesive-backed decals, each decal having a different punishment written thereon;
    wherein in use decals are selected and attached to the punishment wheel at various locations thereon, the knob wheel is spun, and a punishment is selected according to which decal the pointer points to when the knob comes to rest.

2. The apparatus of claim 1 wherein the base wheel includes radial lines from the central portion of the base wheel to its periphery that divide it into a plurality of circular sectors of equal size, and further includes a first circular line and a second circular line of larger diameter than the first circular line, which circular lines are concentric with the center of the base wheel and intersect the radial lines thereby defining a plurality of annular sectors, and wherein the decals are shaped to conform to the annular sectors of the base wheel, and the diameter of the knob wheel is less than, or equal to, the diameter of the first circular line.

3. The apparatus of claim 2 wherein the number of circular sectors is eight and the number of annular sectors is also eight.

4. The apparatus of claim 1 wherein the base wheel includes a centrally disposed cylindrical boss, the knob wheel includes an upstanding, centrally disposed cylindrical knob portion and an annular disk portion radially outward therefrom and joined to the knob portion at the lower margin thereof, and the knob portion has a cylindrical recess that receives the boss for rotation thereon, and further comprising means for rotatably attaching the knob portion to the boss.

5. The apparatus of claim 4 wherein the rear margin of the recess of the knob portion includes an annular lip for rotating contact with the base wheel, and the rear surface of the disk portion is raised away so that it does not contact the base wheel, whereby the knob wheel can rotate with minimal friction.

6. The apparatus of claim 5 wherein the base wheel includes radial lines from the central portion of the base wheel to its periphery that divide it into a plurality of circular sectors of equal size, and the base wheel further includes a first circular line and a second circular line of larger diameter than the first circular line, which circular lines are concentric with the center of the base wheel and intersect the radial lines thereby defining a plurality of annular sectors, wherein the decals are shaped to conform to the annular sectors of the base wheel, and the diameter of the knob wheel is less than, or equal to, the diameter of the first circular line.

7. The apparatus of claim 6 wherein the number of circular sectors is eight and the number of annular sectors is also eight.

8. The apparatus of claim 1 wherein the punishments written on the decals comprise one or more of the following: "NO TV," "GROUNDED," "TIME OUT," "K.P.," "NO DESSERT," "DONATE a TOY," "K.P.," "NO SPORTS," "NO PHONE," "NO FRIENDS," "SWATS," "NO VISITING," "NO TREAT," "HOUSE CHORES."

9. The apparatus of claim 1 further comprising a decal having written thereon "PARENTS CHOICE," indicating that the parent of a child to be punished will choose the punishment to be imposed on the child.

10. The apparatus of claim 1 further comprising a decal having written thereon "KID'S CHOICE," indicating that the child will choose his own punishment.

11. The apparatus of claim 6 wherein the punishments written on the decals comprise one or more of the following: "NO TV," "GROUNDED," "TIME OUT," "K.P.," "NO DESSERT," "DONATE a TOY," "K.P.," "NO SPORTS," "NO PHONE," "NO FRIENDS," "SWATS," "NO VISITING," "NO TREAT," "HOUSE CHORES."

12. The apparatus of claim 6 further comprising a decal having written thereon "PARENTS CHOICE," indicating that the parent of a child to be punished will choose the punishment to be imposed on the child.

13. The apparatus of claim 6 further comprising a decal having written thereon "KID'S CHOICE," indicating that the child will choose his own punishment.

* * * * *